July 14, 1925.
R. P. PESCARA
1,546,313
SUPPORTING SYSTEM FOR MACHINES OF AERIAL NAVIGATION
Filed April 25, 1922    2 Sheets-Sheet 1
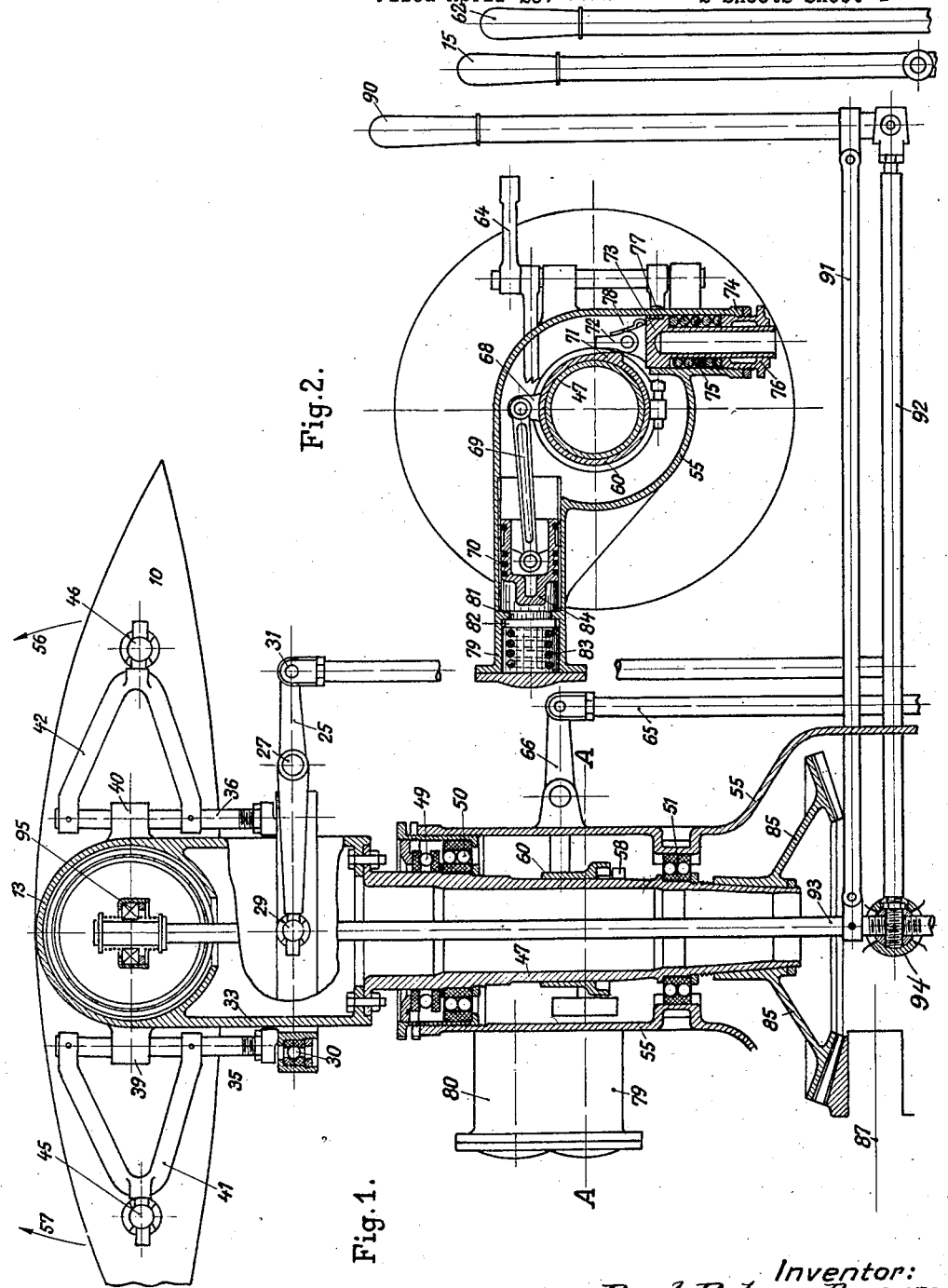
Inventor:
Raul Pateras Pescara July 14, 1925.
R. P. PESCARA
1,546,313
SUPPORTING SYSTEM FOR MACHINES OF AERIAL NAVIGATION
Filed April 25, 1922   2 Sheets-Sheet 2
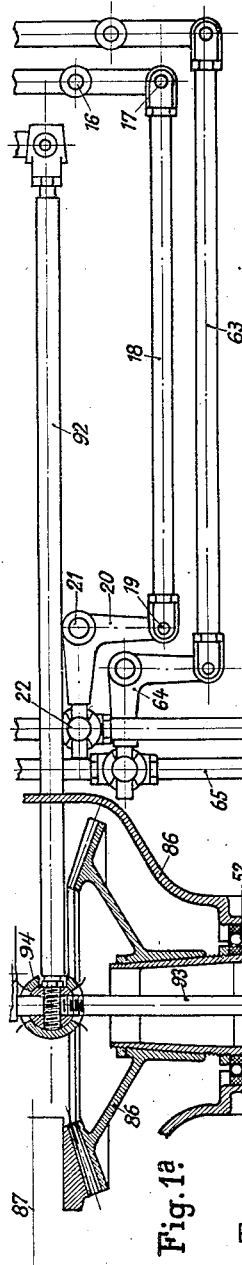
Inventor:
*Raul Pateras Pescara*

Patented July 14, 1925.

1,546,313

UNITED STATES PATENT OFFICE.

RAUL PATERAS PESCARA, OF BARCELONA, SPAIN.

SUPPORTING SYSTEM FOR MACHINES OF AERIAL NAVIGATION.

Application filed April 25, 1922. Serial No. 556,541.

*To all whom it may concern:*

Be it known that I, RAUL PATERAS PESCARA, citizen of the Argentine Republic, residing at Barcelona, Spain, Calle de la Buena Suerte 20, have invented certain new and useful Improvements in Supporting Systems for Machines of Aerial Navigation, of which the following is a specification.

The invention is directed to an improvement in machines adapted for aerial navigation, and is designed to provide a machine having the advantages of the helicopter type and aeroplane type.

The characteristic object is the provision of a supporting system for machines of this type, together with various controls and operating means therefor, which supporting system may at the will of the aviator be permitted a rotation for use as supporting propellers or be held fixed relative to the body of the machine for use as aeroplane supporting surfaces.

A further object is the provision of means whereby the angle of incidence of the supporting surfaces may be changed at will.

The invention is illustrated in the accompanying drawings, in which:

Figs. 1 and 1ª together constitute a vertical sectional view, showing the supporting system in the form of an upper or superior supporting surface and a lower or inferior supporting surface, the superior supporting surface being shown in transverse section in outline, and the inferior supporting surface being shown in longitudinal section.

Fig. 2 is an enlarged section through the locking means.

Fig. 3 is a plan of the frame work of one end of one of the supporting surfaces.

The supporting surfaces 10 and 11 are constructed as aeroplane wings or planes of the thick wing type, each surface comprising upper and lower blades supported by metallic longitudinal struts 12, having transverse ribs covered with any suitable material as linen or the like. The frame work at each end of the wing or plane is supported in a central carrier 14, through the medium of an intermediate section 13, so that each supporting surface is divided in two parts in a manner to permit the respective parts to be independently moved about their longitudinal axes.

To provide for using the supporting surfaces as planes or as propellers, the carriers 14 of the respective surfaces are fixed to longitudinal hubs 47 and 48 rotatably supported through the medium of ball bearings 49, 50, 51, 52, 53, and 54, in a special casing 55. Slidably mounted upon what may be termed the enlarged portions 33 and 34 forming continuations of the hubs referred to, are ball bearings 30 and 32, these ball bearings being longitudinally adjustable of the hub sections through the medium of forks 25—26 connected together beyond their pivots by a rod 23, which is connected for appropriate movement at 22 to one end of a bell crank lever 20. The bell crank lever is pivotally supported at 21 and in turn connected at 19 to one end of a rod 18, the opposite end of which is connected at 17 to a hand lever 15 pivotally supported intermediate its ends at 16. The forks 25 and 26 are pivotally supported at 27 and 28 and their fork terminals are connected at 29 to the outer race member of the ball bearings 30 and 32, whereby movement of the handle 15 will cause these ball bearings to be moved in the same direction longitudinally of the hub extensions. The inner raceways of the respective ball bearings 30 and 32 support at diametrically opposite points, rods 35 and 36, which are slidably guided in lugs 39 and 40. V-shaped sections 41 and 42 are fixed to the respective rods 35 and 36 at one end and at the opposite end are connected with the longitudinal struts 12 of the respective sections of each surface. In connection with the construction just described, appropriate movement of the hand lever 15 will move the ball bearings 30 and 32 and thus in connection with the upper supporting surface 10 will move the respective sections thereof in the direction of the arrows 56 and 57. The supporting surface will then have the aspect of a propeller with two blades, and as the angle of incidence is controlled both in direction and degree by the movement of the lever 15, the angle of incidence of these blades is variable and reversible.

The hubs 47 and 48 terminate in conical tooth crowns 85 and 86, adapted to be operated by a pinion 87 driven from a motor not shown by any convenient transmission or clutch also not shown. The respective supporting surfaces are thus operable as propellers with manual control of the angle of incidence at will.

To provide for the use of these supporting surfaces as planes of an aeroplane, it is obviously necessary that they be fixed with relation to each other and to the machine, and the invention contemplates means for this locking and unlocking of these supporting surfaces at will. Slidably mounted on the hub sections 47 and 48 are sleeves 60 and 61, having serrated or notched edges offset from the surface of the hub and adapted, when operated, to engage projections or teeth 58 and 59 on the respective hubs. The sleeves 60 and 61 are operated by levers 66 67, connected by a rod 65, which latter is connected intermediate its ends to a bell crank 64, and the latter operated by a rod 63 having connection with a handle 62. Thus the sleeves 60 and 61 may at will be moved longitudinally of the hubs to engage the teeth 58 and 59 to thereby indirectly lock the hubs and therefore the supporting surfaces with respect to the casing 55.

To provide for absorbing the shock for the interruption of the propeller movement for the supporting surfaces by the locking means described, each of the sleeves 60 and 61 is provided with a radial lug 68 connected to one end of a rod 69, the other end of which carries a piston 70 operating in a cylinder 79, full of oil, and communicating with an adjacent cylinder 80 which is supplied with air of a predetermined pressure. The cylinder 79 is provided with an annular internal flange 81 against the air side of which is arranged a non-air tight disc 82 held in position by a spring 83. The piston 70 has a reduced head 84 which can pass through the opening interiorly of the flange 81. The sleeves 60 and 61 are each provided with a projection or tooth 71, and a latch 72 is arranged to cooperate therewith for locking purposes. The latch 72 is carried by a piston 73 movable in a cylinder 74 fixed with the casing 55. A spring 75 adjustably tensioned by a cap 76 fitting the end of the cylinder 74, bears upon the piston 73 and cushions the movement thereof, a spring 78 influencing the latch toward the tooth 71 of the sleeve. In the movement of the sleeves 60 and 61 into cooperation with the teeth 58 and 59, the sleeves are fixed with relation to the hubs 47 and 48 and the further rotary movement of the sleeves incident to the then rotary movement of the hubs is retarded by the dash pot effect of the piston 70, until finally the tooth 71 rides beyond the latch 72. At this movement, the head 84 of the piston 70 has engaged the disc 82, and the rotative force has been completely absorbed by this dash pot action. Of course any additional rotative force will carry the piston head 84 farther in its air compressive movement and correspondingly move the tooth 71 away from the end of the latch 72, but to establish equilibrium, the parts move in the reverse direction under the air pressure, and this reverse movement is absorbed by the spring 75 behind the latch until the parts come to rest in proper position to maintain the supporting surfaces as planes of an aeroplane. Obviously, the reverse movement of the lever 72 moves the sleeves 60 and 61 from cooperation with the teeth 58, 59, when the hubs are again free for rotative movement. The stability of the machine is obtained by periodic differential warping of the extremities of the supporting surfaces when these surfaces work as propellers or by ordinary warping when these supporting surfaces act as fixed planes. This warping is controlled by a rod 93 which extends through the hubs 47, 48, and is centrally provided with a ball section operating in a fixed socket, permitting the inclination of the rod 93 around this joint 94 in all directions, the movement of the rod being controlled by rods 91, 92, connected to the usual joy stick 90. The terminals of the rod 93 are arranged within the respective supporting surfaces and are there provided with ball and socket joint ball bearings 95, 96. On the exterior raceway of each of these ball bearings are fixed sleeves 97, 98, and arranged in these sleeves are tubes 89, caps 100, holding the tubes in place but permitting their independent rotation. The tubes extend in opposite directions longitudinally and centrally of the supporting surface and are connected to the longitudinal struts 12 of each section of the surface by keys 108 passing through slots in the tubes. The tubes are further provided with threaded sections 101, 102, arranged near the ends of the tube, which sections cooperate with threaded sleeves 103, 104, having arms 105, 106, connected to a secondary longitudinal strut 107 arranged near the edge of the surface section.

By operation of the joy stick and the consequent inclination of the rod 93, the ball bearings 96 will be correspondingly tilted, with the effect to cause the respective rods 89 to move longitudinally in opposite directions, and thereby cause a corresponding raising or lowering movement of the outer ends of the arms 105, 106, and a corresponding raising or lowering of the edge of the supporting surface in which the secondary strut 107 is fixed. In the use of the supporting surfaces as propellers, this warping is of course periodic, while in the use of the supporting surfaces as fixed planes, the warping provides for the lateral stability as in the ordinary aeroplane. It will be appreciated that the mechanism for securing variable incidence of the surfaces as hereinabove described, does not interfere with and is not obstructed by the warping mechanism just described, as through the mounting of the inner ends of the tubes 89, they may be turned bodily on themselves through the movement of the keys 108.

The gearing 85, 86, 87, is in effect a differential, for if the apparatus be considered as in full flight, an inequality may be produced between the resistance to rotation of the superior and inferior supporting surfaces. In fact, this inequality may, by suitable mechanism, be controlled in order to permit directing the machine in a given direction. In the event of inequality of the forces of resistance, the pinion 87 is exposed to different re-actions from the two propellers marked 85, 86, and is therefore subject to a resultant strain or stress perpendicular to its axis of rotation. This strain or stress is transmitted to the pinion bearings and thereby to the whole machine. The effect produced is thus to cause the machine and pinion 87 to turn in space about the vertical axis of rotation of the supporting surfaces. Thus pinion 87 acts as a satellite of the differential formed by the gear set noted, or the elements of which turn around the common axis of the supporting surfaces at different speeds, the speed of rotation of the pinion 87 being equal to the difference between the speeds of rotation of the supporting surfaces.

What is claimed as new, is:

1. In an aerial machine, superimposed supporting surfaces, independent hubs connected thereto, a differential for operating the respective surfaces in opposite directions, and means for locking the supporting surfaces in relative rigidity with the machine, said locking means including a shock absorbing interlock.

2. An aerial machine, comprising a supporting surface adapted for rotative use as a propeller, means for locking said surface for use as a plane, means for periodically warping a portion of such surface, said means being automatically controlled in the use of the surface as a propeller.

3. An aerial machine, comprising a supporting surface adapted for rotative use as a propeller, means for locking said surface for use as a plane, means for periodically warping a portion of such surface, said means being automatically varied in the use of the supporting surface as a propeller.

4. In an aerial machine, superimposed supporting surfaces, independent hubs connected thereto, a differential for operating the respective surfaces in opposite directions, and means for locking the supporting surfaces in relative rigidity with the machine, said locking means including a shock absorbing interlock, and means for independently controlling the operating means and locking means.

5. An aerial machine comprising a supporting surface adapted for rotative use as a propeller, means for locking said surface for use as a plane, means for automatically and periodically warping a portion of such surface when such surface is in use as a propeller, and means for controlling the warping means.

6. An aerial machine comprising a casing, a supporting surface arranged above the casing, a supporting surface arranged below the casing, means for operating said surfaces simultaneously for use as propellers, means for fixing said shafts relative to the casing to utilize said surfaces as planes, warping means mounted on each surface, and a shaft extending longitudinally of the casing and simultaneously controlling said warping means.

RAUL PATERAS PESCARA.